United States Patent [19]
Vaughan et al.

[11] Patent Number: 5,741,005
[45] Date of Patent: Apr. 21, 1998

[54] ROTARY DISK CONTROL VALVE FOR A WATER CONDITIONING SYSTEM

[75] Inventors: Don Vaughan, Brookfield; Greg A. Sebastian, Wauwatosa, both of Wis.

[73] Assignee: Fleck Controls, Inc., Brookfield, Wis.

[21] Appl. No.: 618,422

[22] Filed: Mar. 15, 1996

[51] Int. Cl.$^6$ ............................................. F16K 5/10
[52] U.S. Cl. ............................................. 251/208
[58] Field of Search ............................. 251/208, 205

[56] References Cited

U.S. PATENT DOCUMENTS

| | | |
|---|---|---|
| 2,807,280 | 9/1957 | Kittredge. |
| 2,878,786 | 3/1959 | Vuillemin. |
| 3,811,712 | 5/1974 | Barrera. |
| 3,863,675 | 2/1975 | Wiltshire. |
| 4,440,382 | 4/1984 | Pruvot et al. ............. 251/208 X |
| 4,895,655 | 1/1990 | Schindler. |
| 4,936,348 | 6/1990 | Swanson. |
| 5,452,744 | 9/1995 | Otto. |
| 5,467,799 | 11/1995 | Buccicone et al. ......... 251/208 X |

FOREIGN PATENT DOCUMENTS 2455700  11/1980  France.

Primary Examiner—Kevin Lee
Attorney, Agent, or Firm—Lee, Mann, Smith, McWilliams, Sweeney & Ohlson

[57] ABSTRACT

A control valve is provided for a water conditioning system having a mineral tank. The control valve includes a housing having an upper body portion and a lower body portion. The housing defines a chamber located between the upper and lower body portions. The upper body portion includes a first upper port, a second upper port, and a third upper port. The lower body portion includes a first lower port, second lower port, and a third lower port which provide fluid communication with the tank. A cylindrical disk is located within the chamber and is selectively rotatable about a central axis. The disk includes an upper face having a generally centrally located aperture and a peripherally located aperture. The disk also includes a spaced apart lower face having a first peripherally located aperture and a second peripherally located aperture. A first fluid passage extends through the disk between the centrally located aperture in the upper face and the first peripherally located aperture in the lower face. A second fluid passage extends through the disk between the peripherally located aperture in the upper face and the second peripherally located aperture in the lower face. Rotation of the disk about the central axis to one of various different positions as desired provides selective fluid communication between the upper ports in the upper body portion and the lower ports in the lower body portion of the control valve.

15 Claims, 5 Drawing Sheets

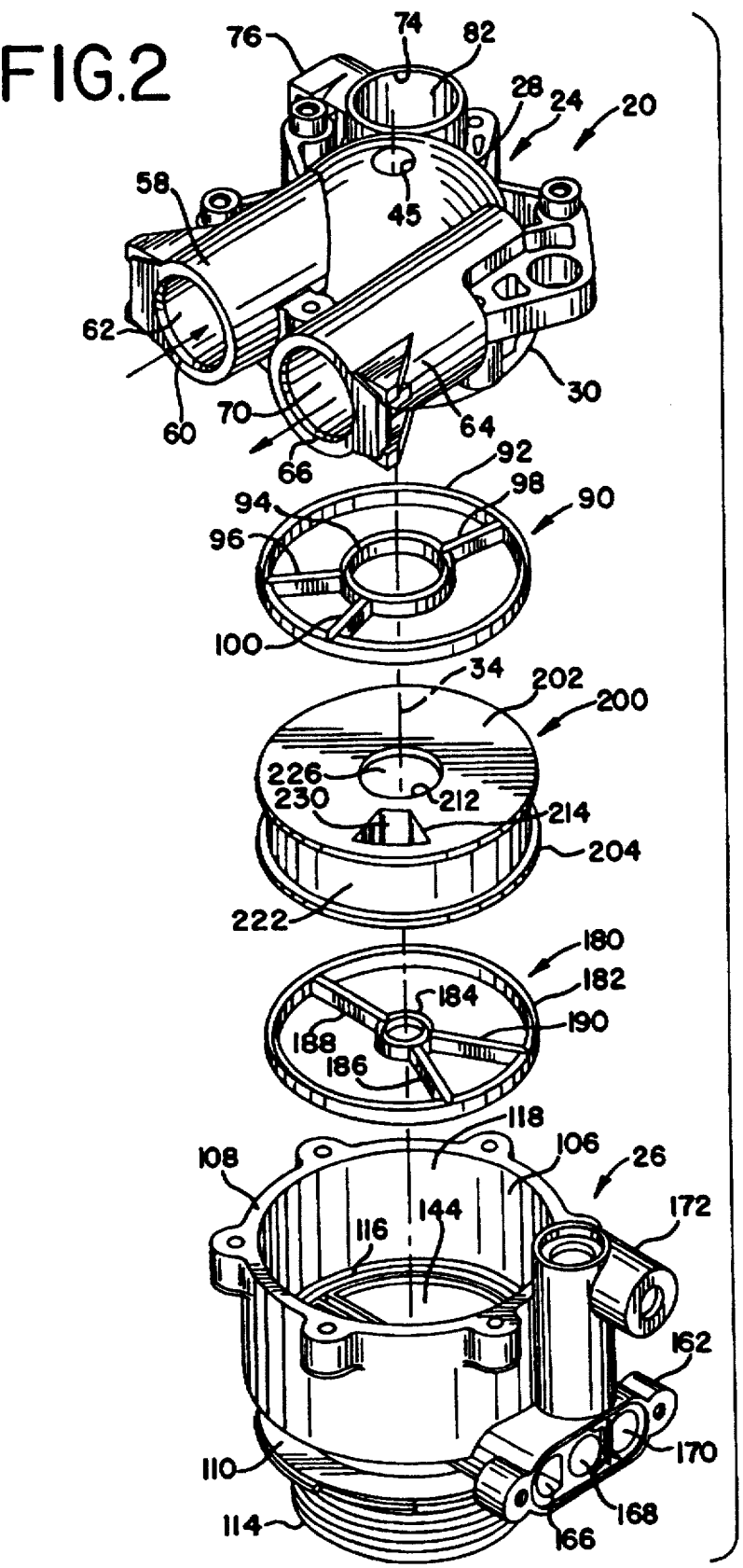

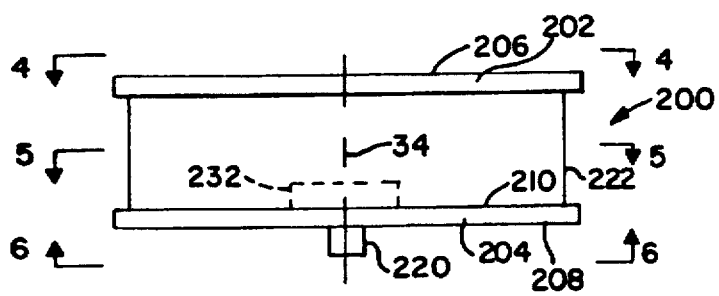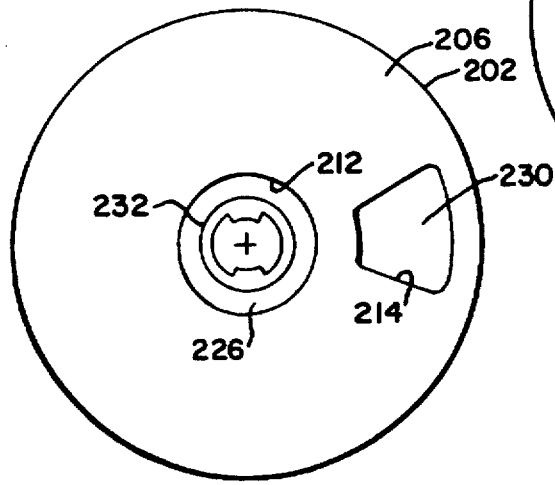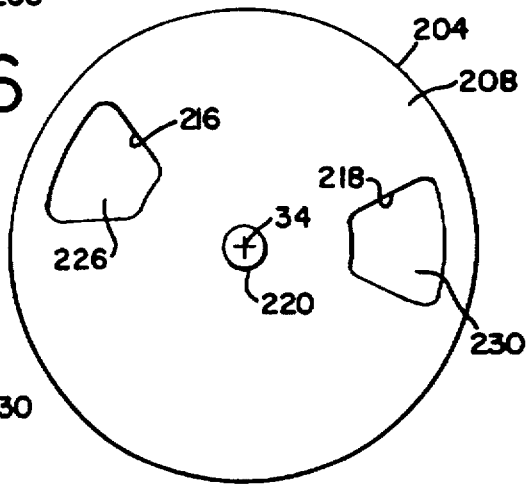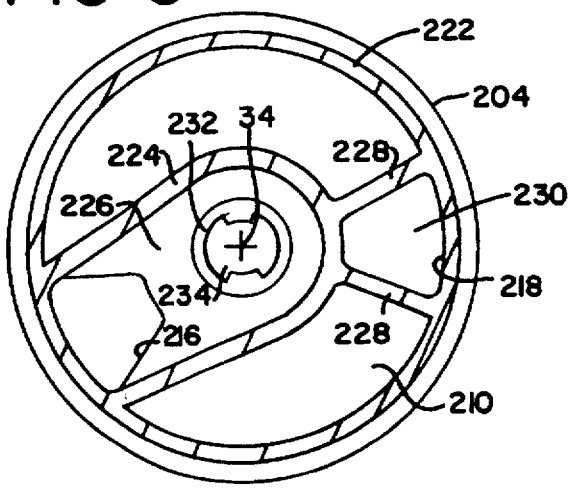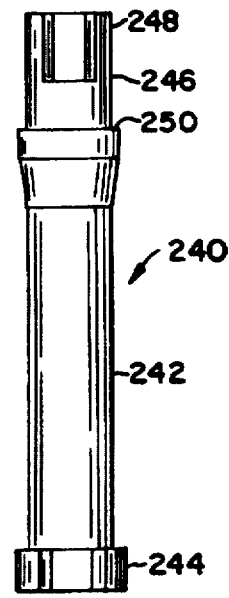

ROTARY DISK CONTROL VALVE FOR A WATER CONDITIONING SYSTEM

BACKGROUND OF THE INVENTION

The present invention is directed to a control valve which may be used in connection with a water conditioning system, and in particular to a control valve having a selectively rotatable disk for selectively opening and closing fluid flow passages between a mineral tank attached to a lower body portion of the valve and a plumbing system attached to an upper body portion of the valve.

Water conditioning or treatment devices of the ion exchange type, often referred to as water softeners, typically include a tank having a resin bed through which hard water passes to exchange its hard ions of calcium and magnesium for soft sodium ions of the resin bed. Regeneration of the resin bed is periodically required to remove the accumulation of hardness causing ions and to replenish the supply of sodium ions in the resin. A control mechanism operates a valve which controls the operation of the water conditioning device. The control valve selectively switches the water conditioning device between a service mode and a regeneration mode. The control valve also controls various cycles the water treatment system undergoes during regeneration such as the backwash cycle, the brine cycle, the rinse cycle and the brine tank refill cycle. The present invention provides a control valve for controlling the operation of a water conditioning system utilizing a rotatable disk located between an upper valve body portion having a hard water inlet passage and a conditioned water outlet passage and a lower valve body portion connected to the resin tank which reduces the amount of head loss which occurs in other control valves.

SUMMARY OF THE INVENTION

A control valve is provided for a water conditioning system having a mineral tank. The control valve includes a housing having an upper body portion, a lower body portion, and a chamber defined therein. The upper body portion includes a first upper port, a second upper port, and a third upper port. The lower body portion includes a first lower port, a second lower port, and a third lower port which provide fluid communication with the mineral tank. A generally cylindrical disk is located within the chamber of the housing. The disk is selectively rotatable in a clockwise and/or counterclockwise direction about a central axis. The disk includes an upper face having a generally centrally located aperture and a peripherally located aperture, and a lower face having a first peripherally located aperture and a second peripherally located aperture. A first fluid passage extends through the disk between the centrally located aperture in the upper face and the first peripherally located aperture in the lower face. A second fluid passage extends through the disk between the peripherally located aperture in the upper face and the second peripherally located aperture in the lower face. Rotation of the disk about the central axis to one of various different positions provides selective fluid communication through the disk between the upper ports in the upper body portion and the lower ports in the lower body portion of the housing.

BRIEF DESCRIPTION OF THE DRAWINGS

FIG. 2 is an exploded view of the control valve.

FIG. 3 is a side elevational view of the rotary disk.

FIG. 4 is a top plan view of the rotary disk taken along lines 4—4 of FIG. 3.

FIG. 5 is a cross-sectional view of the rotary disk taken along lines 5—5 of FIG. 3.

FIG. 6 is a bottom view of the rotary disk taken along lines 6—6 of FIG. 3.

FIG. 7 is a side elevational view of the spindle which provides selective rotation of the rotary disk.

DETAILED DESCRIPTION OF THE PREFERRED EMBODIMENT

Figure 8:
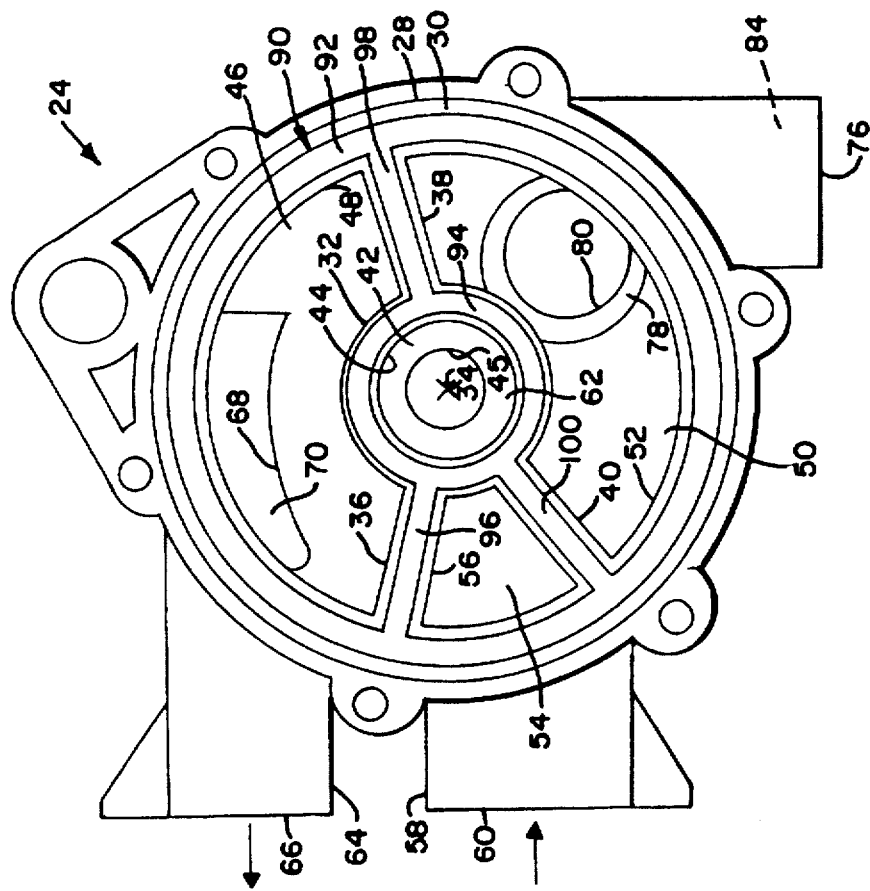
FIG. 8 is a bottom view of the upper body portion of the housing of the control valve.

The control valve 20 of the present invention is used in connection with a water conditioning system having a mineral tank (not shown) and a control mechanism (not shown) for operating the control valve 20. The control valve 20 includes a housing 22 having an upper body portion 24 and a lower body portion 26. The upper body portion 24 of the housing 22 includes an outer wall 28, which is generally hemispherical or dome-shaped, having a generally circular rim 30. The upper body portion 24 also includes a generally cylindrical wall 32 concentrically located within the rim 30 of the outer wall 28, as shown in FIG. 8. The cylindrical wall 32 is formed about a central axis 34. The upper body portion 24 also includes an internally located first wall 36, a second wall 38 and a third wall 40. Each of the walls 36, 38 and 40 extend radially between the cylindrical wall 32 and the outer wall 28. The faces of the walls 36, 38 and 40 are generally coplanar. The cylindrical wall 32 forms a central chamber 42 having a port 44 located at the face of the circular wall 32 which is in communication with the chamber 42. The outer wall 28 includes an aperture 45 in communication with the chamber 42. The aperture 45 is concentrically located about the axis 34. The upper body portion 24 also includes a first peripheral chamber 46 formed between the cylindrical wall 32, the first wall 36, the outer wall 28 and the second wall 38, and a port 48 in the general shape of a portion of an annulus, located at the faces of the walls 32, 36, 28 and 38, in communication with the chamber 46.

The upper body portion 24 also includes a second peripheral chamber 50 having a port 52 in the general shape of a portion of an annulus. The chamber 50 and port 52 are formed by the outer wall 28, the third wall 40, the cylindrical wall 32 and the second wall 38. The upper body portion 24 also includes a third peripheral chamber 54 having a port 56 in the general shape of a portion of an annulus. The chamber 54 and port 56 are formed between the outer wall 28, the first wall 36, the cylindrical wall 32 and the third wall 40. The chamber 54 is sealed other than for the port 56.

The upper body portion 24 includes a fluid conduit 58 having an inlet port 60 and an outlet port (not shown) in the wall of the cylindrical wall 32 in communication with the central chamber 42. A first fluid passage 62 is thereby formed which extends from the inlet port 60 through the fluid conduit 58 into the chamber 42 of the cylindrical wall 32 to the port 44. The upper body portion 24 also includes a fluid conduit 64 having an outlet port 66 and a port 68 formed in the outer wall 28 between the walls 36 and 38. A second fluid passage 70 extends from the port 48 of the first peripheral chamber 46 through the port 68 of the fluid conduit 64 to the outlet port 66. The inlet port 60 is adapted to be connected to a supply of unconditioned water. The outlet port 66 is adapted to be attached to a plumbing system for the supply of conditioned water for use.

The upper body portion 24 includes an external port 74 and an external port 76. A wall 78 is located within the chamber 50 and includes a port 80 in fluid communication with the chamber 50. A third fluid passage 82 extends from the chamber 50, through the port 80, to the external port 74 which is located concentrically with the port 80 along an axis parallel to the central axis 34. The external port 74 includes a removable cap (not shown) for selectively opening and closing the port 74. A fourth fluid passage 84 extends from the port 80 to the external port 76. The third fluid passage 82 and the fourth fluid passage 84 are in fluid communication with one another.

A resilient elastomeric gasket 90 is located on the upper body portion 24 of the housing 22. The gasket 90 includes a generally circular peripheral portion 92 extending along the face of the rim 30 of the outer wall 28, a generally circular central portion 94 extending along the face of the cylindrical wall 32, a first leg 96 extending radially between the central portion 94 and the peripheral portion 92 along the face of the first wall 36, a second leg 98 extending radially between the central portion 94 and the peripheral portion 92 along the face of the second wall 38, and a third leg 100 extending radially between the central portion 94 and the peripheral portion 92 along the face of the third wall 40.

The centerline of the first wall 36 is located approximately 155° in a counter-clockwise direction from the centerline of the second wall 38, as shown in FIG. 8, and the centerline of the third wall 40 is located at approximately 155° from the centerline of the second wall 38 in a clockwise direction as shown in FIG. 8.

Figure 1:
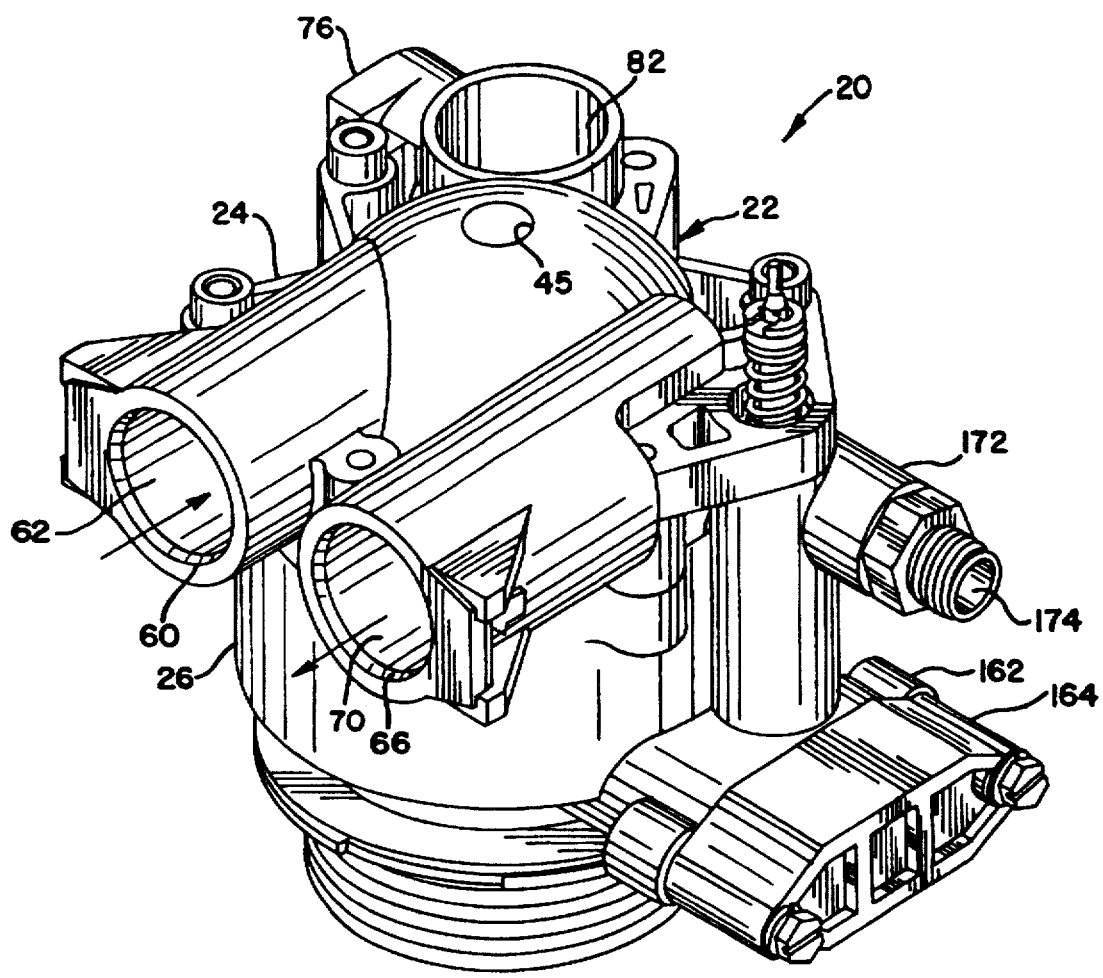
FIG. 1 is a perspective view of the control valve of the present invention.
Figure 9:
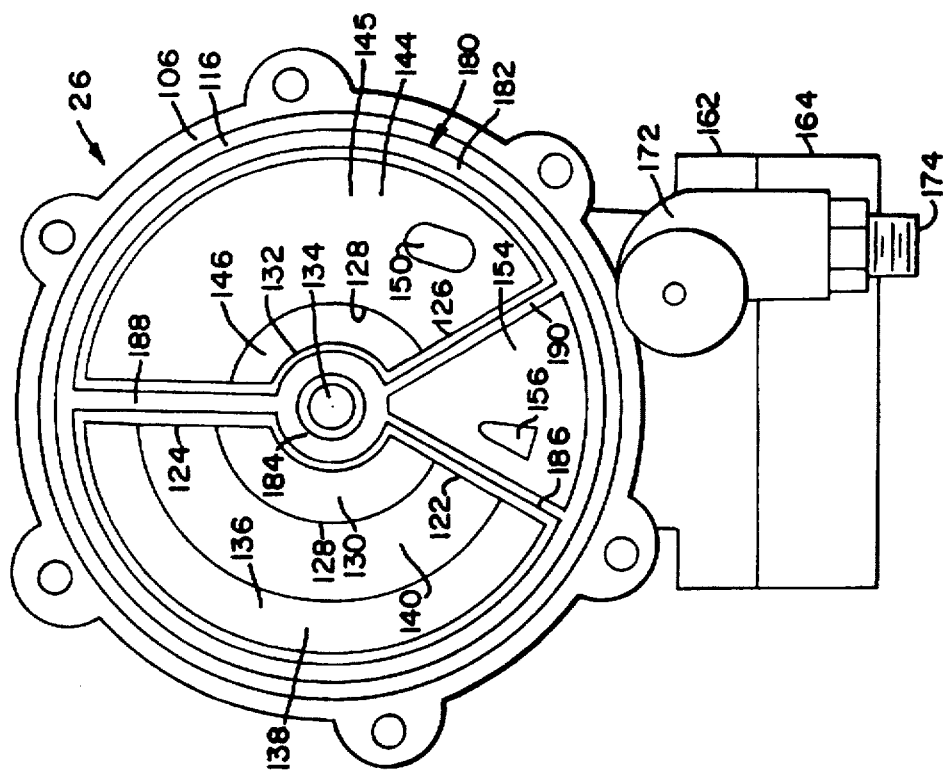
FIG. 9 is a top plan view of the lower body portion of the housing of the control valve.
Figure 10:
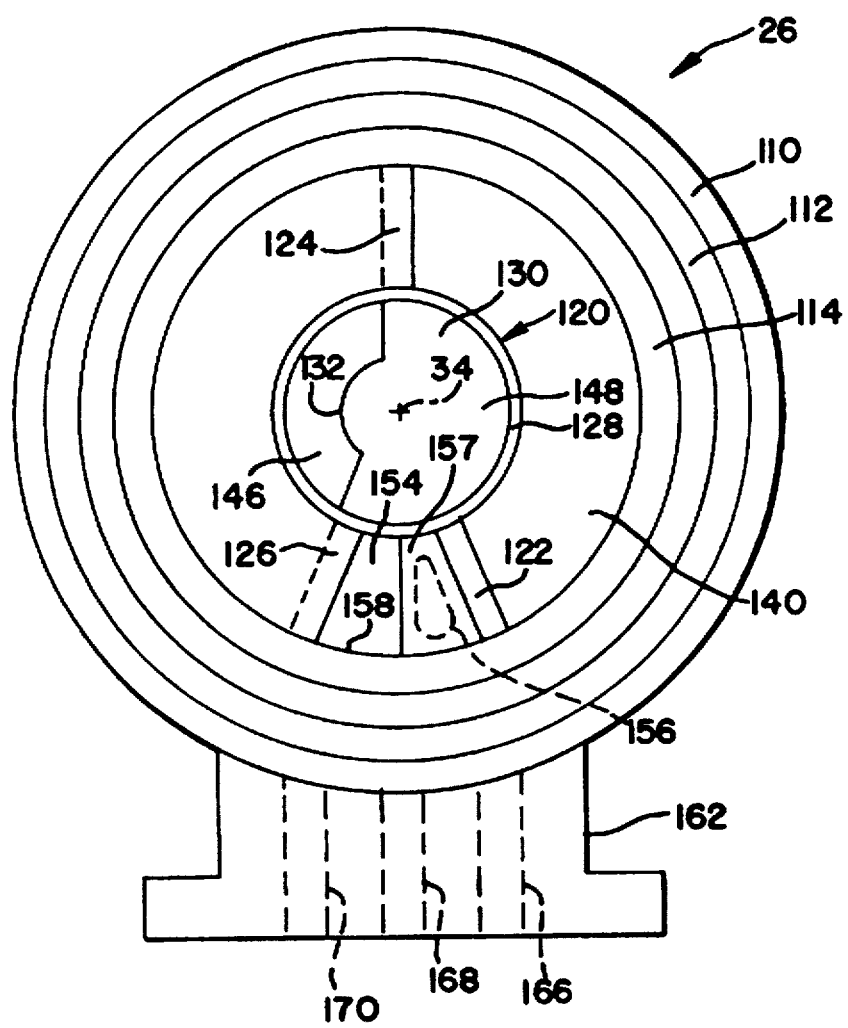
FIG. 10 is a bottom view of the lower body portion of the housing of the control valve.

As best shown in FIGS. 2 and 9, the lower body portion 26 of the housing 22 includes an upper generally cylindrical wall 106 having a circular rim 108. The cylindrical wall 106 is attached to a circular flange 110 having a generally circular raised ridge 112 on its opposite side, as best shown in FIG. 10. A lower generally cylindrical wall 114 extends downwardly from the flange 110. The wall 114 is externally threaded for attachment to the resin tank. A generally circular ledge 116 extends around the interior of the bottom portion of the cylindrical wall 106. The cylindrical wall 106 forms a chamber 118 therein.

The lower body portion 26 also includes a center section 120, a first wall 122, a second wall 124 and a third wall 126. Each of the walls 122, 124 and 126 extend radially between the center section 120 and the cylindrical wall 114 and ledge 116, as best shown in FIG. 10. The centerline of the wall 122 is located approximately 155° in a clockwise direction from the centerline of the wall 124, as shown in FIG. 10, and the centerline of the wall 126 is located approximately 155° from the centerline of the wall 124 in a counter-clockwise direction.

The center section 120 includes a lower generally cylindrical wall 128, as best shown in FIG. 10, which is adapted to be coupled to a first fluid passage in the mineral tank. The center section 120 also includes an upper conical wall portion 130 as shown in FIG. 9. The conical wall portion 130 extends from the first wall 122 to the second wall 124. The center section 120 also includes a generally circular top wall 132 having a centrally located recess 134. The top wall 132 is coplanar with the ledge 116. A conical wall section 136 extends downwardly and inwardly from the ledge 116 to the lower cylindrical wall 114 and extends between the first wall 122 and the second wall 124. A chamber 138 is formed between the conical wall section 136, the first wall 122, the second wall 124 and the conical wall portion 130 which is in fluid communication with a port 140. The port 140 is formed as a portion of an annulus and is located between the bottom edge of the lower cylindrical wall 114, the bottom edges of the first and second walls 122 and 124, and the bottom edge of the cylindrical wall portion 128. The port 140 is adapted to be placed in fluid communication with a second fluid passage in the mineral tank.

A conical wall section 144 extends downwardly and inwardly from the ledge 116 to the cylindrical wall portion 128 of the center section 120 and extends between the second wall 124 and the third wall 126. A chamber 145 is formed between the conical wall section 144 and the walls 124 and 126 that is in communication with a port 146. The port 146 is located between the top wall 132, the second wall 124, the third wall 126 and the bottom edge of the conical wall section 144. The port 146 is in fluid communication with a circular port 148 formed in the bottom end of the cylindrical wall portion 128. The conical wall section 144 includes a port 150 in communication with the chamber 145.

A generally triangular-shaped wall 154 extends transversely to the central axis 34 between and generally coplanar with the ledge 116, the top wall 132 of the center section 120, and the top faces of the first wall 122 and the third wall 126. The wall 154 includes a port 156. As shown in FIG. 10, a port 158 is located in the cylindrical wall 114 below the triangular wall 154 and between the first wall 122 and third wall 126. A chamber 157 is located between the first wall 122 and the third wall 126 and below the triangular wall 154 as shown in FIG. 10. The chamber 157 and port 158 are adapted to be placed in fluid communication with the second fluid passage of the mineral tank.

The lower body portion 26 includes a bracket 162 having a removable cover 164. The bracket 162 includes a first bore 166 which is in fluid communication with the port 156 in the triangular wall 154. The bracket 162 includes a second bore 168 which is in fluid communication with the port 158 and the chamber 157 located below the triangular wall 154. The bracket 162 includes a third bore 170 which is in fluid communication with the port 150 formed in the conical wall section 144. The bore 166 is in fluid communication with the bore 168. The bores 168 and 170 are in fluid communication with one another and with an eductor valve 172. The eductor valve 172 includes a port 174 adapted for attachment to a brine tank (not shown).

The lower body portion 26 of the housing 22 includes a gasket 180 formed from a resilient elastomeric material. The gasket 180 includes a peripheral portion 182 which is generally circular and which extends along the ledge 116. The gasket 180 includes a generally circular central portion 184 located on the top wall 132 of the center section 120 and which extends around the recess 134. A first leg 186 extends radially from the central portion 184 to the peripheral portion 182 along the upper face of the first wall 122 and along the top of the triangular wall 154. A second leg 188 extends radially from the central portion 184 to the peripheral portion 182 along the upper face of the second wall 124. A third leg 190 extends radially from the central portion 184 to the peripheral portion 182 along the upper face of the third wall 126 and along the top of the triangular wall 154.

The control valve 20 also includes a generally cylindrical disk 200 located within the chamber 118 of the lower body portion 26. The disk 200 is selectively rotatable in a clockwise and/or counter-clockwise direction as desired about the central axis 34. As best shown in FIGS. 3–6, the disk 200 includes a generally circular upper face 202 and a spaced apart and parallel generally circular lower face 204. The upper face 202 includes an upper surface 206 and the lower face 204 includes a lower surface 208 and an interior surface 210. The upper face 202 includes a circular aperture 212 centrally located about the axis 34. The upper face 202 also includes a peripheral aperture 214 located radially outwardly from the aperture 212 and adjacent the edge of the upper face 202. As best shown in FIG. 6, the lower face 204 includes a first peripherally located aperture 216 and a second peripherally located aperture 218. A cylindrical stem 220 extends downwardly from the lower surface 208 of the lower face 204 and is concentrically located on the axis 34. The stem 220 is adapted to be rotatably located within the recess 134 of the center section 120 of the lower body portion 26.

As best shown in FIGS. 3 and 5, the disk 200 includes a generally circular peripheral wall 222 which extends between the upper face 202 and the lower face 204. A generally U-shaped wall 224, which is located within the peripheral wall 222, and which extends between the upper face 202 and lower face 204, forms a first fluid passage 226 through the disk 200 extending from the central aperture 212 in the upper face 202 to the peripheral aperture 216 located in the lower face 204. The disk 200 also includes two internal walls 228, each of which extends between the U-shaped wall 224 and the peripheral wall 222 and between the upper face 202 and lower face 204. The walls 222, 224 and 228 form a second fluid passage 230 which extends axially through the disk 200 between the second peripheral aperture 218 located in the lower face 204 and the peripheral aperture 214 in the upper face 202. The walls 228, and the portions of the walls 222 and 224 which extend between the walls 228, are nonperforate. The peripheral aperture 214 and the peripheral aperture 218 are axially aligned with one another along an axis which is generally parallel to the central axis 34. The first and second peripheral apertures 216 and 218 in the lower face 204 are located at an angle of approximately 150° about the central axis 34 relative to one another. A receptacle 232 having a generally spline-shaped recess 234 is located on the interior surface 210 of the lower face 204 concentrically with the axis 34.

The control valve 20 also includes a spindle or actuator member 240 as shown in FIG. 7. The spindle 240 includes a lower stem portion 242 having a lower spline-shaped end 244 and an upper stem portion 246 having an upper spline-shaped end 248. A collar 250 is formed between the upper stem 246 and lower stem 242. The spline-shaped end 244 of the spindle 240 is adapted to be inserted within the spline-shaped recess 234 of the receptacle 232 such that the spindle 240 extends concentrically along the axis 34 and through the central aperture 212 in the upper face 202 of the disk 200. The disk 200 is thereby attached to the spindle 240 such that rotation of the spindle 240 about the axis 34 provides a corresponding rotation of the disk 200. The upper end 248 of the spindle 240 projects through the aperture 45 in the upper body portion 24 of the housing 22. The upper end 248 of the spindle 240 is adapted for connection to a control mechanism for selectively controlling the rotation of the spindle 240 and disk 200 to various different rotational positions as desired. The collar 250 of the spindle 240 creates a seal in connection with an O-ring (not shown) with the upper body portion 24 to prevent fluid leakage through the aperture 45.

In operation, selective rotation of the spindle 240 provides a corresponding rotation of the disk 200 within the housing 22. The disk 200 may be rotated in either the counter-clockwise or clockwise direction as desired about the axis 34. The upper face 202 of the disk 200 sealingly engages the gasket 90 to thereby seal the first peripheral chamber 46, second peripheral chamber 50, third peripheral chamber 54, and the central chamber 42 in the upper body portion 24 from one another along the upper face 202 of the disk 200. The lower face 204 of the disk 200 sealingly engages the gasket 180 such that the chamber 138, chamber 145, and port 156 in the lower body portion 26 are sealed from one another along the lower face 204 of the disk 200. The central aperture 212 of the first fluid passage 226 of the disk 200 is always in fluid communication with the first fluid passage 62 of the upper body portion 24 and the inlet port 60 no matter what position the disk 200 is rotated to. Depending upon the particular rotational position of the disk 200, various different fluid passages through the valve 20 are opened and closed.

When the disk 200 is rotated to a position wherein the second peripheral aperture 218 is in communication with the second chamber 145 and is located adjacent to the wall 126 of the lower body portion 26, the peripheral aperture 214 is in fluid communication with the first peripheral chamber 46 and is located adjacent the wall 38 of the upper body portion 24, and the first peripheral aperture 216 is in fluid communication with the first chamber 138. When the disk 200 is located in this position, a first fluid passage extends from the inlet port 60 through the first fluid passage 226 of the disk 200 to the port 140 in the lower body portion 26. A second fluid passage is formed extending from the port 146, through the second fluid passage 230 of the disk 200 to the first peripheral chamber 46 and the outlet port 66. In this position the control valve 20 provides unconditioned fluid flow to the mineral tank through the inlet 60 and conditioned fluid flow from the outlet port 66.

When the disk 200 is rotated to a position wherein the second peripheral aperture 218 is in fluid communication with the second chamber 145 of the lower body portion 26 and is located adjacent to the wall 124, the peripheral aperture 214 is in fluid communication with the second peripheral chamber 50 of the upper body portion 24, and the first peripheral aperture 216 is in fluid communication with the port 156 in the triangular wall 154. When the disk 200 is in this position, a first fluid passage is formed between the inlet port 60, through the first fluid passage 226 of the disk 200 to the port 156, through the bore 166 of the bracket 162, through bore 168 of the bracket 162, to port 158 and chamber 157 and port 140 of the lower body. A second fluid passage is formed extending from the port 146 through the second chamber 145, through the second fluid passage 230 of the disk 200 to the second peripheral chamber 50 and port 80 in the upper body portion 24. In this position, fluid flows through port 156 and through bores 166 and 168 to draw brine solution through port 174 and the eductor valve 172, then though port 158 and into the mineral tank. The bore 170 of bracket 162 of the lower body portion 26 is preferably obstructed by a removable plug (not shown). If desired, the bore 168 can be obstructed and the bore 170 opened to allow fluid flow through port 156 and through bores 166 and 170 to draw brine solution through port 174 and the eductor valve 172, then through port 150, into the second chamber 145 of the lower body portion 26 and through port 146, into the mineral tank.

When the disk 200 is rotated to a position wherein the second peripheral aperture 218 is located adjacent the wall 124 and is in fluid communication with the first chamber 138 of the lower body portion 26, the peripheral aperture 214 is located adjacent the wall 40 in fluid communication with the second peripheral chamber 50, and the first peripheral aperture 216 is located adjacent the wall 126 and is in fluid communication with the second chamber 145 of the lower body portion 26. A first fluid passage is thereby formed from the inlet port 60, through the first fluid passage 226 of the disk 200, to the second chamber 145 and ports 146 and 150. A second fluid passage extends from the port 140 and the first chamber 138 in the lower body portion 26, through the second fluid passage 230 of the disk 200, to the second peripheral chamber 50 and port 80 in the upper body portion 24. In this position, the fluid flowing into the mineral tank backwashes the media in the mineral tank and is discharged through the port 80 to a drain.

When the disk 200 is rotated to a position wherein the peripheral aperture 214 is located between the walls 36 and 40 of the upper body portion 24 and is in fluid communication with the third peripheral chamber 54, the second peripheral aperture 218 is in fluid communication with the first chamber 138 of the lower body portion 26, and the first peripheral aperture 216 is in fluid communication with the second chamber 145 of the lower body portion 26. A first fluid passage is thereby formed from the inlet port 60, through the first fluid passage 226 of the disk 200 to the second chamber 145 and ports 146 and 150 of the lower body portion 26. Fluid flow through the second fluid passage 230 of the disk 200 is precluded as the second fluid passage 230 is in communication with the port 56 of the third peripheral chamber 54 which is otherwise sealed.

When the disk 200 is rotated to a position wherein the second peripheral aperture 218 is simultaneously in fluid communication with the port 156 in the triangular wall 154 and with the chamber 145 of the lower body portion 26, the peripheral aperture 214 is in fluid communication with the first peripheral chamber 46 of the upper body portion 24, and the first peripheral aperture 216 is in fluid communication with the first chamber 138 of the lower body portion 26. A first fluid passage is thereby formed from the inlet port 60, through the first fluid passage 226 of the disk 200 to the first chamber 138 and port 140 of the lower body portion 26. A second fluid passage is formed from the port 146 through chamber 145, through the second fluid passage 230 of the disk 200 to the first peripheral chamber 46, and outlet port 66 of the upper body portion 24. A third fluid passage is formed from the second peripheral aperture 218 of the disk 200 through the port 156 of wall 154 of the lower body portion 26, through the bore 166 of the bracket 162, into the bore 168 and through the eductor valve 172 and port 174 to the brine tank.

When the disk 200 is rotated to a position wherein the second peripheral aperture 218 is located adjacent to the wall 122 and is in fluid communication with the first chamber 138 of the lower body portion 26, the peripheral aperture 214 is in fluid communication with the first peripheral chamber 46 and outlet port 66 of the upper body portion 24, and the first peripheral aperture 216 is in fluid communication with the second chamber 145 of the lower body portion 26. A first fluid passage is thereby formed from the inlet port 60, through the first fluid passage 226 of the disk 200 to the second chamber 145 and ports 146 and 150. A second fluid passage is formed from the port 140 and the first chamber 138, through the second fluid passage 230 of the disk 200 to the first peripheral chamber 46 and outlet port 66 of the upper body portion 24.

When the disk 200 is rotated to a position wherein the first peripheral aperture 216 is adjacent to wall 122 of the lower body portion 26 and is in fluid communication with the first chamber 138, the second peripheral aperture 218 is located between walls 124 and 126 of the lower body portion 26 and is in fluid communication with chamber 145 of the lower body portion 26. A first fluid passage is thereby formed from the inlet port 60, through the first fluid passage 226 of the disk 200, to the first chamber 138 and port 140 of the lower body portion 26. A second fluid passage extends from the port 146 and the second chamber 145 in the lower body portion 26, through the second fluid passage 230 of the disk 200, to the second peripheral chamber 50 and the port 80 in the upper body portion 24. In this position, the fluid flowing into the mineral tank rinses the media in the mineral tank and is discharged through the port 80 to a drain.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A control valve for a water conditioning system having a tank including:

a housing having an upper body portion and a lower body portion, said housing defining a chamber between said upper body portion and said lower body portion, said upper body portion including a first upper port, a second upper port, and a third upper port, said lower body portion including a first lower port, a second lower port, and a third lower port, said first, second and third lower ports adapted to provide fluid communication with the tank;

a disk located within said chamber, said disk being selectively rotatable about a central axis, said disk including an upper face having a generally centrally located aperture and a peripherally located aperture, a lower face having a first peripherally located aperture and a second peripherally located aperture, a first fluid passage extending between said centrally located aperture in said upper face and said first peripherally located aperture in said lower face, and a second fluid passage extending between said peripherally located aperture in said upper face and said second peripherally located aperture in said lower face;

whereby rotation of said disk about said central axis provides selective fluid communication between said upper ports in said upper body portion and said lower ports in said lower body portion through said first and second fluid passages in said disk.

2. The control valve of claim 1 including actuator means for selectively rotating said disk to a selected one of a plurality of rotational postions.

3. The control valve of claim 1 wherein said first upper port is generally centrally located and said second and third upper ports are peripherally located with respect to said central axis.

4. The control valve of claim 1 wherein said peripherally located aperture in said upper face of said disk is axially aligned with said second peripherally located aperture in said lower face of said disk.

5. The control valve of claim 1 wherein said upper face and said lower face of said disk are generally planar and spaced apart from one another.

6. The control valve of claim 5 wherein said disk includes a first wall extending between said upper face and said lower face, said first wall forming said second fluid passage.

7. The control valve of claim 6 wherein said disk includes a second wall extending between said upper face and said lower face of said disk, said second wall forming said first fluid passage.

8. The control valve of claim 6 wherein said first wall is a nonperforate.

9. The control valve of claim 1 including a first gasket located between said upper face of said disk and said upper body portion of said housing.

10. The control valve of claim 9 wherein said first gasket includes a peripheral member, a central member having central aperture extending therethrough, three leg members extending between said central member and said peripheral member, and three peripheral apertures, each said peripheral aperture being located between an adjacent pair of leg members.

11. The control valve of claim 9 including a second gasket located between said lower face of said disk and said lower body portion of said housing.

12. The control valve of claim 11 wherein said second gasket includes a peripheral member, a central member, three leg members each respectively extending between said central member and said peripheral member, and three apertures, each said aperture being located between an adjacent pair of said leg members.

13. The control valve of claim 2 wherein said actuator means comprises an actuator member having a first end and a second end, said actuator member extending through said upper body portion of said housing and being selectively rotatable about said central axis, said second end being attached to said disk such that rotation of said actuator member provides conjoint rotation of said disk.

14. The control valve of claim 13 wherein said actuator member extends through said centrally located aperture in said upper face of said disk and said second end of said actuator member is attached to said lower face of said disk.

15. The control valve of claim 1 including an eductor mechanism, a third fluid passage extending between said third lower port in said lower body portion of said housing and said eductor mechanism, and a fourth fluid passage extend between said first lower port in said lower body portion of said housing and said eductor mechanism.

* * * * *